UNITED STATES PATENT OFFICE.

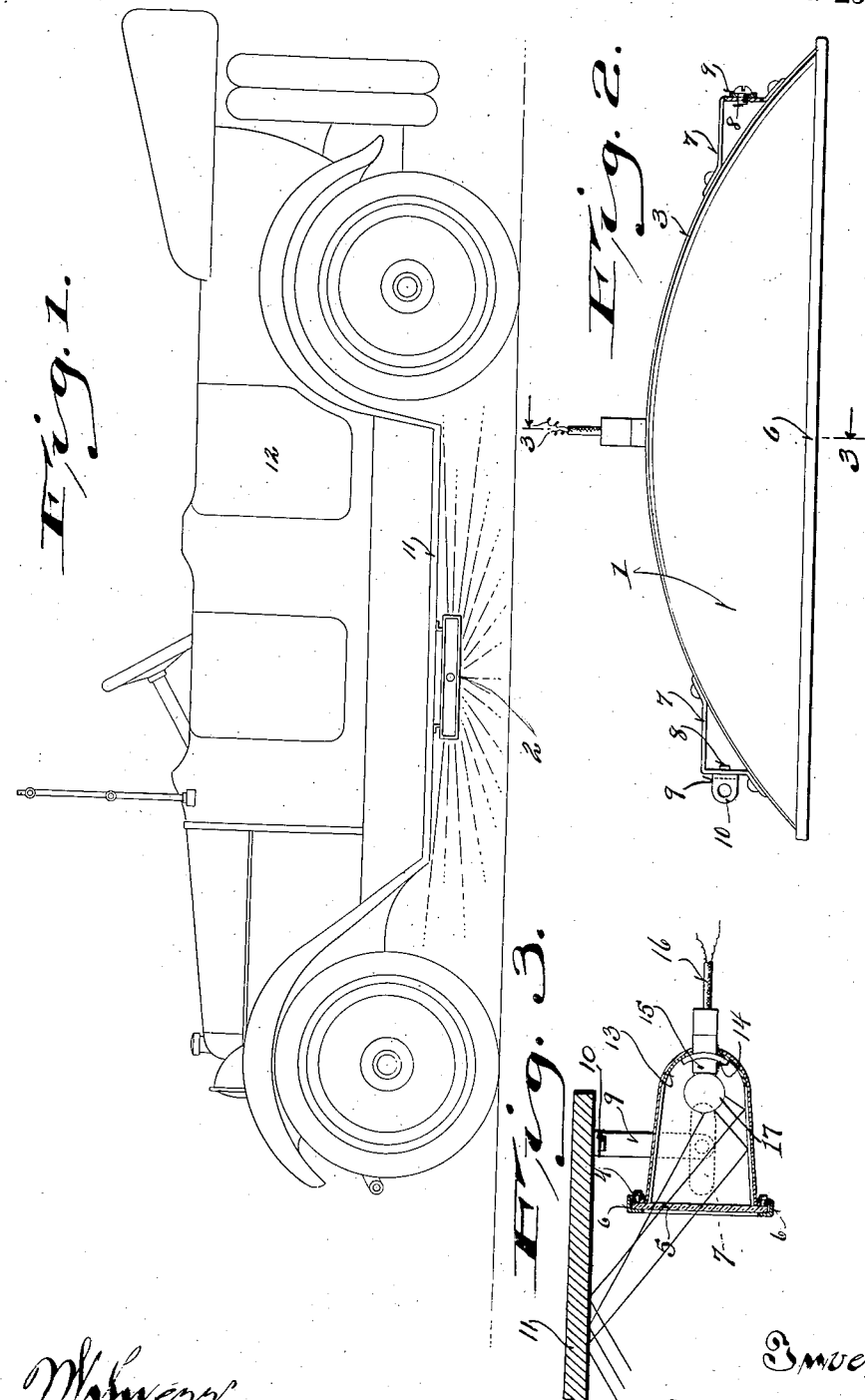

ANTON J. CHMURSKI, OF MILWAUKEE, WISCONSIN, ASSIGNOR TO FRANK RIGAS, OF MILWAUKEE, WISCONSIN.

AUTOMOBILE LIGHTING DEVICE.

1,395,039.     Specification of Letters Patent.     Patented Oct. 25, 1921.

Application filed August 30, 1920. Serial No. 406,977.

*To all whom it may concern:*

Be it known that I, ANTON J. CHMURSKI, a citizen of the United States, and resident of Milwaukee, in the county of Milwaukee and State of Wisconsin, have invented certain new and useful Improvements in Automobile Lighting Devices; and I do hereby declare that the following is a full, clear, and exact description thereof.

My invention relates to new and useful improvements in lighting means for automobiles, motor trucks and other vehicles.

Most drivers of vehicles who have traveled to any extent at night appreciate the fact that it is quite difficult to be able to accurately judge the distance between vehicles when passing each other and also the distances between the vehicles and the edges of the road. This difficulty is especially prevalent when a vehicle whose headlights are relatively close together is being passed and has led to serious accidents either by reason of the vehicles colliding or by the overturning of one of the vehicles into the usual roadside ditch.

Therefore it is the primary object of this invention to provide a lighting means which will effectively illuminate the side of the road to the left of a vehicle or on the side thereof which is being passed by the other vehicle.

It is likewise an object of this invention to provide a lighting means which will so illuminate the side of the vehicle which is being passed by a second vehicle as to make the parts, such as the left hand front wheel and fender and the edge of the running board, stand out in strong outlines.

Still another object of the invention is to provide a lighting system which will effectively illuminate the road surface and greatly aid the vehicle driver to turn his vehicle.

It is a more specific object of the invention to provide a lighting device for use beneath either one or both of the running boards of a vehicle.

With these and other objects in view which will become apparent as the description proceeds the invention resides in the novel features of construction, combination and arrangement of parts which will be hereinafter more particularly described and claimed, and shown in the accompanying drawing in which:

Figure 1 represents a side elevational view of an automobile having my invention applied thereto and hung below the left hand running board.

Fig. 2 is a plan view, partly in section, of the lighting device, and

Fig. 3 is a transverse sectional view taken on the plane of the line 3—3 of Fig. 2.

In carrying out my invention, it is obvious that the principal function thereof, that is to say the lighting of the road surface to one side of a vehicle when the same is being passed by a second vehicle, may be carried out in various ways other than that depicted in the present drawing. In other words the addition of a lighting device on the side of the vehicle which is normally passed by other vehicles for illuminating the road surface the entire length of the vehicle is the primary object.

In its illustrated embodiment the invention comprises an elongated lamp casing 1 having substantially flat top and bottom sides which define an elongated rectangular opening 2, and an arcuate deflecting back 3. Such a casing may be made from a suitable stamping of light gage sheet metal, and surrounding the opening 2 is a laterally outwardly turned flange 4 against which a transparent closure plate 5 preferably of glass, is seated. Retaining strips 6 substantially U-shaped in cross section, secure the closure plate 5 in position over the opening 2 of the lamp casing 1.

On the curved back 3 at each end portion thereof is secured a hanger bracket 7, each of these brackets being roughly U-shaped in plan view and having their bight portions disposed at right angles to the plane of the closure plate 5. Also each of said bight portions has a pivot hole receiving a bolt 8 or the like whereby a substantially L-shaped hanger 9 is adjustably attached thereto. One of the arms of the hanger 9 is in the form of an attaching ear 10 whereby the casing 1 may be suspended from beneath the running board 11 of an automobile or other vehicle 12.

Since simplicity and cheapness of construction is one of the aims of this invention, I provide a removable reflector 13 for the lamp casing 1. This reflector may be in the form of a sheet or strip of relatively thin and flexible material which can be buffed and polished while flat and when placed in the casing will conform to the contour of the wall thereof or may be a stamping. The intermediate portion of the deflector sheet is held to the casing wall by the usual collar or the like 14 which is carried by a light socket 15, said socket extending through the reflector and the casing wall and having current conducting wires 16 connected therewith. If necessary or desirable, the opposite ends of the elongated strip forming the reflector 13 may be secured between the end flanges 4 of the casing 1 and the closure plate 5.

In use the casing 1 is hung from the under side of the running board 11 of a vehicle in such a position that the plane of the closure 5 will be parallel to the edge of the running board and the rays of light from the lamp 17 will be directed approximately horizontally across the road surface, which surface will be brightly illuminated from one end of the vehicle to the other. Slight adjustments of the casing to direct the rays of light upwardly or downwardly is possible as the result of the herein described manner of supporting of said casing on the hangers 9. Also the casing is located substantially midway the ends of the running board and spaced inwardly from the outer edge thereof such a distance as to permit the wheels and the fenders on the side of the vehicle on which the light is located to be defined in prominent outline. In other words the casing is positioned with the idea of accentuating the edges of the fenders and running board and the adjacent wheels as well as lighting the whole surface of the road to the side of the vehicle. The current conducting wires 16 may be led to the interior of the vehicle connected with a suitable push button or other switch so that the lamp 17 may be lighted when the vehicle is being passed by a second vehicle, or kept lighted at all times, and in this way avoid all danger of collision. An advantage in mounting the casing beneath the running board is that any stray rays of light which ordinarily might be projected upwardly are retarded by the running board or directed downwardly toward the road surface. Obviously lighting means of this type may be disposed beneath each of the running boards if it is necessary or convenient.

I claim:

The combination with a vehicle having a running board on the side thereof of a light casing mounted beneath the running board, means in the casing for throwing the major portion of its rays of light laterally of the direction of travel of the vehicle for illuminating the road at the side thereof when passed by a second vehicle, said running board forming a guard to prevent rays of light being thrown in the air and also acting as an additional reflecting surface to direct the rays of light in the direction of the road surface.

In testimony that I claim the foregoing I have hereunto set my hand at Milwaukee, in the county of Milwaukee and State of Wisconsin.

ANTON J. CHMURSKI.